United States Patent [19]

Bouldin et al.

[11] Patent Number: 5,666,050

[45] Date of Patent: Sep. 9, 1997

[54] DOWNHOLE MAGNETIC POSITION SENSOR

[75] Inventors: Brett Bouldin, Spring; Steve Owens, The Woodlands, both of Tex.

[73] Assignee: PES, Inc., The Woodlands, Tex.

[21] Appl. No.: 560,813

[22] Filed: Nov. 20, 1995

[51] Int. Cl.$^6$ .......................... G01B 7/14; E21B 43/119; E21B 47/04; E21B 49/04

[52] U.S. Cl. .............. 324/207.26; 324/207.16; 324/226; 166/66.5

[58] Field of Search ............ 324/207.11, 207.15, 324/207.16, 207.22, 207.24, 207.26, 226, 236, 262; 166/66.5, 250, 255

[56] References Cited

U.S. PATENT DOCUMENTS

| | | | |
|---|---|---|---|
| 4,820,980 | 4/1989 | Dodson-Edgars | 324/207.15 |
| 5,279,366 | 1/1994 | Schales | 166/254 |

Primary Examiner—Walter E. Snow

[57] ABSTRACT

A well apparatus for detecting the position of a moving element in a well. Downhole well tools normally comprise a magnetically permeable material which forms a Faraday Shield to interrupt the flux of a magnet positioned within the well tool. The invention attaches a magnet to a moving element surrounded by a magnetically permeable second element, and a magnetic sensor is positioned within a recess in the second element. The magnetic sensor detects the proximate position of the magnet and generates a signal. The signal can be transmitted to a surface controller for display or for generating a command signal to displace the moving element within the second element. A single wire can transmit signals from multiple sensors in a sensor array, and the absolute position and movement rate of the moving element can be identified by the sensor array. The magnet can comprise a permanent magnet or can comprise an electromagnet. The signal from the magnetic source can be modulated to communicate the signal through the second element.

20 Claims, 2 Drawing Sheets

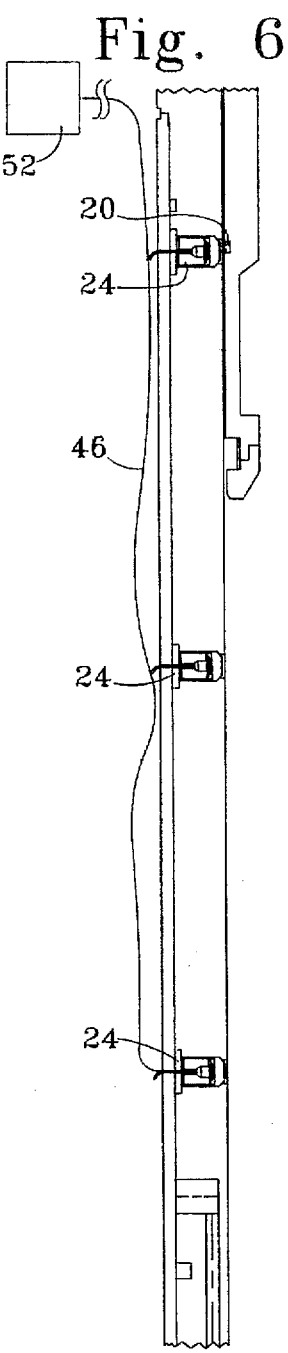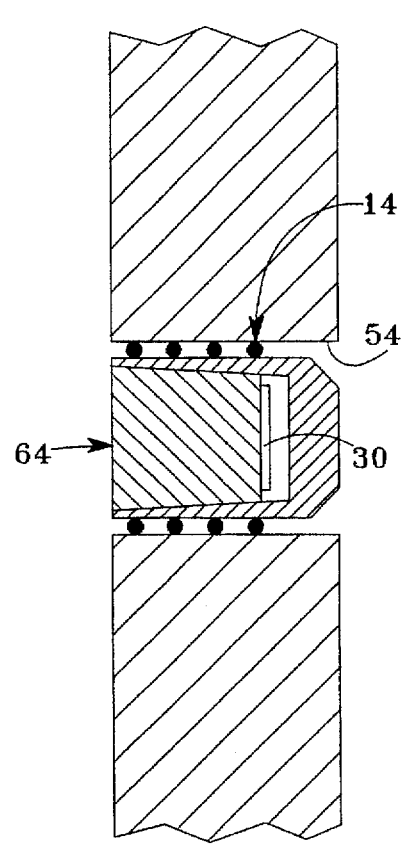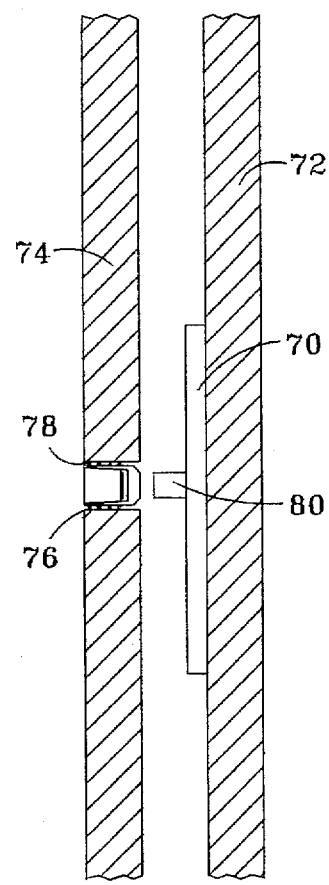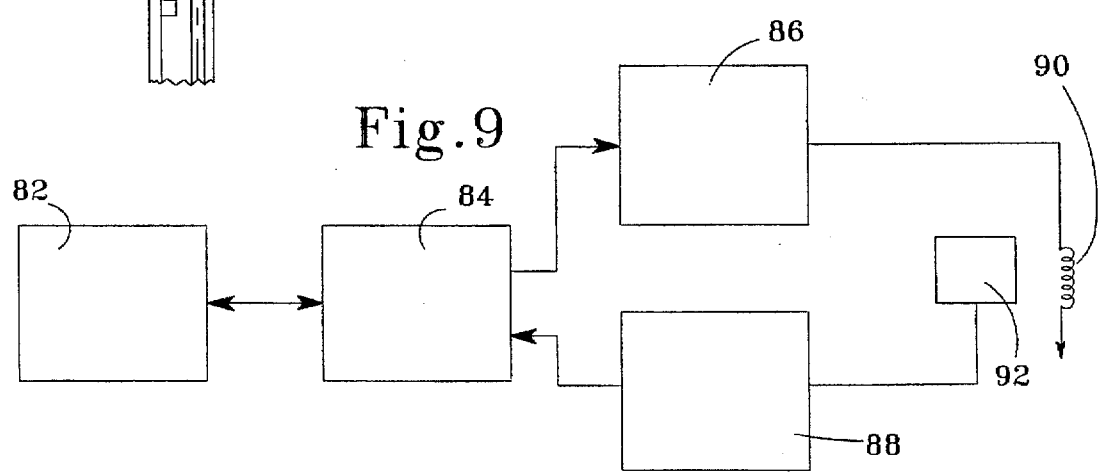

5,666,050

DOWNHOLE MAGNETIC POSITION SENSOR

BACKGROUND OF THE INVENTION

The present invention relates to a system for indicating the position of moving elements. More particularly, the present invention relates to an improved well apparatus for indicating the position of a first element movable relative to a second element constructed from a magnetically permeable material. The invention is especially applicable to signal communication between the interior and exterior surfaces of a pressure vessel positioned downhole in a well.

Downhole well tools are positioned in hydrocarbon wells to perform different functions. Well tools such as sliding sleeves, safety valves, and packers include tool components that move relative to the other elements. Such well tools are attached to cylindrical pipe and typically incorporate pressure sensitive electronic components, guages, sensors, pyrotechnic devices, and other components requiring protection from high well pressures. Because the well pressures can exceed 30,000 psi, the pressure vessels and communication port seals must withstand such pressures without permitting fluid leakage past the fluid seals. The integrity of such seals deteriorate over time and can cause failure of the pressure sensitive well tool components. Additionally, space limitations within a downhole well tool restricts the size and configuration of signal communication devices engaged with the pressure sensitive well tool components.

Various switches have been developed to detect the relative position of moving components. For example, U.S. Pat. No. 4,355,280 to Duzich (1982) disclosed a traveling magnet attached to a spring in an accumulator. A Hall Effect sensor sensed the travel of the magnet, and "flux gathering material" was positioned to increase the sensitivity of the Hall Effect sensor. In U.S. Pat. No. 5,197,508 to Gottling et al. (1993), a magnet was positioned on a movable valve member, and a field sensor detected the position of the magnet. The field sensor was fastened in a magnetically nonconductive housing. In U.S. Pat. No. 5,414,355 to Davidson et al. (1995), a magnet was positioned relative to a carrier, and a Hall effect sensor was positioned to detect movement of the magnet.

None of these devices communicate signals through the wall of a downhole well tool body. In a well, the cylindrical pipe of a well tool body is formed with a carbon steel alloy, a martensitic stainless steel, or other magnetically permeable material capable of withstanding the well fluid pressures. These magnetically nonpermeable materials cooperate with the enclosed tool body configuration to create an effect known as the Faraday Shield effect. Faraday Shields are used to isolate electronic components from strong magnetic fields because a magnetic field will not pass radially through a hollow cylinder constructed from a magnetically permeable material. Consequently, the flux from a traveling magnet in a well pipe cannot be reliably detected by a magnetic sensor located outside of the magnetically permeable well pipe.

The communication of signals through a downhole pressure vessel wall in a well tool has been accomplished in two ways. Magnetic sensors have been positioned within the pressure vessels to detect a moving magnet and to generate an electrical signal, and the sensor signal is transmitted by a sealed feedthrough device through the pressure vessel wall. One feedthrough device is constructed with an electrically nonconductive ceramic material sealed by an O-ring seal to an aperture through the pressure vessel. An electrically conductive pin through the ceramic material communicates electric signals through the pressure vessel wall. However, such feedthrough devices are undesirable because they create potential leak paths, are limited to electric signals, and utilize pin elements which extend outwardly beyond the pressure vessel wall. This latter feature can interfere with other well components in the confined space of the well tool.

To avoid the leakage problems of feedthrough devices, magnetic sensors have been attached to the outer surface of a magnetically nonpermeable pressure vessel to detect the position of a magnet attached to a moving element within the pressure vessel. However, such nonpermeable pressure vessels are constructed from high alloy steels such as Inconel which significantly increase the overall cost of the downhole well tools.

Accordingly, a need exists for an improved sensor capable of detecting relative movement between components of a well tool, and of transmitting a signal representating such movement. The sensor should be operable in cooperation with a tool body constructed from a magnetically permeable material.

SUMMARY OF THE INVENTION

The present invention provides a well apparatus for detecting the position of a first element relative to the inside surface of a second element formed with a magnetically permeable material. A magnetic source is attached to the first element at a position downhole in the well. A recess in the second element has an opening at the inside surface of the second element which is proximate to the magnet as the first element moves relative to the second element. A magnetically nonpermeable plug is positioned within the recess, and a magnetic sensor is positioned within the plug at a distance less than the mean diameter of the recess opening. The magnetic sensor detects the proximity of the magnetic source relative to the magnetic sensor.

In other embodiments of the invention, a second magnetic sensor can be engaged with the first and second elements. The magnetic sensors can be attached to a single wire for transmitting signals, and a surface controller can be attached to the wire to receive the signals and to identify the position of the magnetic source. The surface controller can also be engaged with the first element to generate a command for moving the first element relative to the second element.

In other embodiments of the invention, the magnetic source can comprise a permanent magnet or an electromagnet. The electromagnet signal can be modulated to communicate signals through the second element.

BRIEF DESCRIPTION OF THE DRAWINGS

FIG. 6 illustrates an elevation view of multiple magnetic sensors positioned to detect varying positions of a sliding sleeve.

FIG. 7 illustrates a magnetic sensor engaged with a metallic plug in an aperture through the pressure vessel body.

FIG. 8 illustrates a magnetic source positioned on the moveable tool element and a magnetic sensor positioned within the wall of the pressure vessel.

FIG. 9 illustrates a schematic diagram of the magnetic source and magnetic sensor illustrated in FIG. 8.

DESCRIPTION OF THE PREFERRED EMBODIMENTS

The present invention provides a well apparatus for indicating the position of moving elements in a downhole well tool. The invention is particularly useful in communicating signals between the interior and exterior walls of a pressure vessel downhole in a well.

Figure 1:
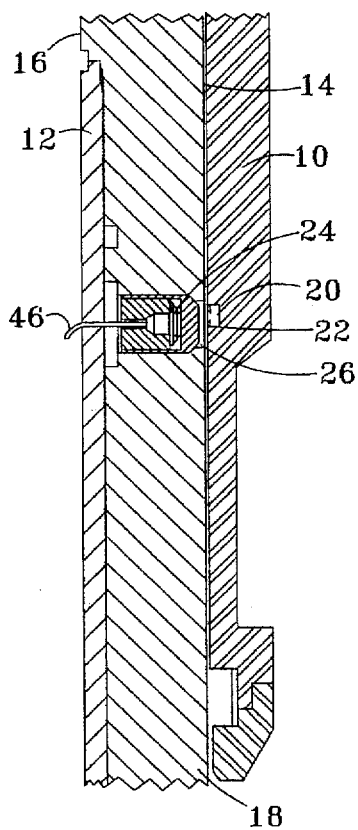
FIG. 1 illustrates an elevation view of a magnetic source attached to a sliding sleeve in a tool body.

Referring to FIG. 1, a first element illustrated as sliding sleeve 10 is positioned within second element or tool body 12. Sliding sleeve 10 comprises a substantially cylindrical tool which creates annulus 14 within tool body 12 and is linearly or rotatably movable within tool body 12. Tool body 12 has exterior surface 16 and interior surface 18 which cooperates with sliding sleeve 10 to form the space identified as annulus 14. In a preferred embodiment of the invention, tool body 12 is constructed from a magnetically permeable material resistant to high fluid pressures acting against exterior surface 16 of tool body 12. As previously described, such pressures can exceed 30,000 psi in a downhole well environment.

The magnetic permeable material of tool body 12 forms a Faraday Shield effect which prevents magnetic flux from being transmitted through tool body 12. To overcome this Faraday Shield effect, magnetic source 20 is positioned within recess 22 in sliding sleeve 10, and magnetic sensor 24 is positioned within recess or aperture 26 in tool body 12. Magnetic source 20 can comprise a permanent magnet, an electromagnet capable of being modulated, or other magnetic source known in the art. Sensor 24 is capable of detecting magnetic flux from magnet 20 when source 20 is proximate to sensor 24.

Figure 2:
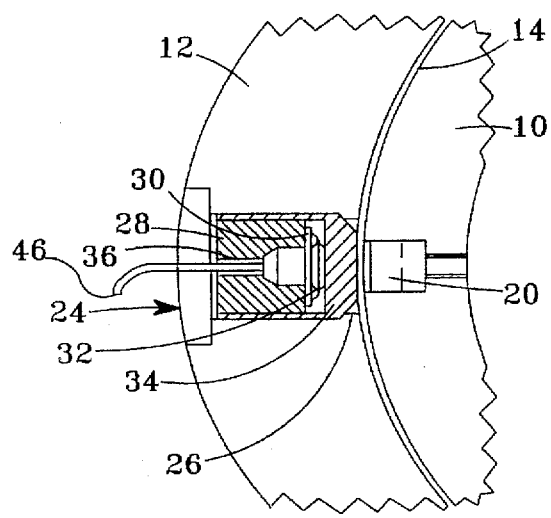
FIG. 2 illustrates a plan view of the magnetic source proximate to a magnetic sensor.

Referring to FIG. 2, a plan view of the invention is illustrated. As illustrated in this embodiment of the invention, sensor 24 includes tapered pin 28, printed circuit board (PCB) 30, reed switch 32, and cup plug 34. Plug 34 is positioned within aperture 26, and pin 28 is pressed to mechanically lock plug 34 into sealing engagement with the wall of aperture 26. Vent hole 36 is positioned in pin 28 to permit the passage of wires as described below. Cup plug 34 is preferably formed with a material that is magnetically nonpermeable or that has a low permeability. This feature of the invention interrupts the Faraday Shield effect otherwise created by tool body 12 and permits the operation of sensor 24.

In one embodiment of the invention, aperture 26 can comprise a recess that does not completely extend through tool body 12. A sleeve such as cup plug 34, constructed from a magnetically nonpermeable material, can be placed between switch 24 and the interior wall of such recess to reduce the Faraday Shield effect caused by tool body 12. In another embodiment of the invention, aperture 26 can extend through tool body 12 and can be plugged with magnetically nonpermeable plug 34 such as the Monel Plug manufactured by the Lee Company. Such plug comprises a shaped plug that can be hammered into aperture 26 and swaged outwardly with a metal pin to create a highly reliable metal to metal seal closing aperture 26.

Figure 3:
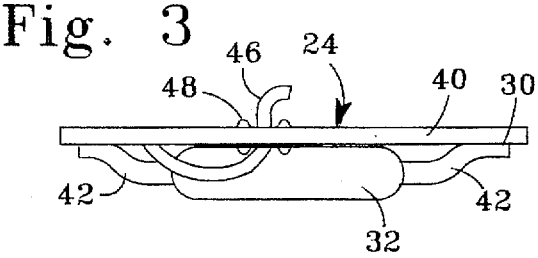
FIG. 3 illustrates an elevation view of a magnetic sensor.
Figure 4:
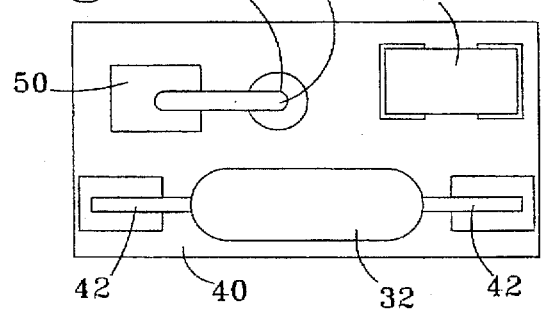
FIG. 4 illustrates a plan view of a magnetic sensor.

Detail of PCB 30 and reed switch 32 is illustrated in FIGS. 3 and 4. Base 40 of PCB 30 is grounded to pin 28 with epoxy or with other techniques known in the art, and contacts 42 attach reed switch 32 to base 40. The closure of reed switch 32 completes the electrical path necessary to permit a signal to be generated by sensor 24. Resistor 44 is selected so that the voltage of the signal generated by reed switch 32 is selectively controlled. Wire 46 is held in aperture 48 of base 40 and is soldered or otherwise connected to solder tab 50. Wire 46 is also positioned through vent hole 36, and PCB 30 can be grounded to pin 28 to create a current return loop.

Figure 5:
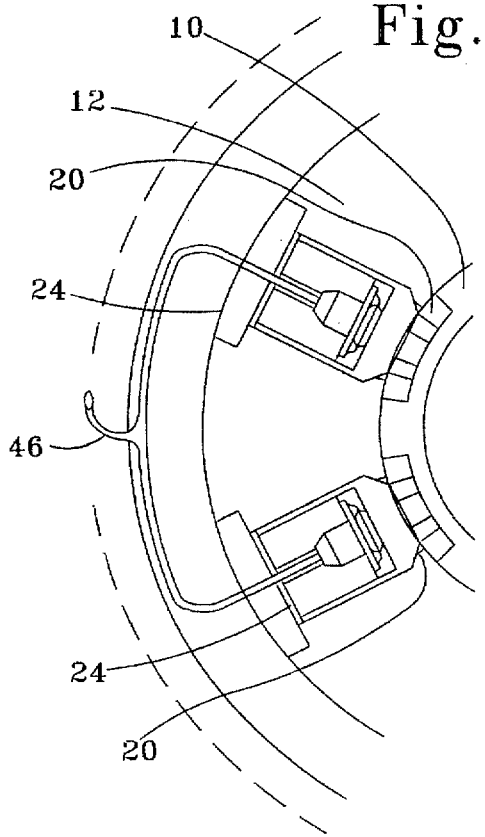
FIG. 5 illustrates a plan vies of redundant sensors in a well tool body.

As shown in FIG. 5, two groups of magnets 20 and sensors 24 can be positioned within sliding sleeve 10 and tool body 12 to provide redundancy to the sensing system. If one sensor 24 should fail, the correlating sensor 24 can continue to function without requiring the removal of the well tool from the well.

In a sensor array such as shown in FIG. 6, multiple sensors 24 are positioned in a well tool, a potential voltage is placed on wire 46, and a different potential voltage is returned by each sensor 24 depending on the resistor 44 associated with each reed switch 32. In this manner, different magnet positions can be detected by an array of sensors 24, and the different sensors 24 can generate different voltage signals to distinguish one sensor 24 (and the correlative magnet position) from other sensors 24. Wire 46 can communicate with surface controller 52 as shown in FIG. 6.

One embodiment of the invention transmits signals over wire 46 to identify magnet 20 location without requiring additional transmission wires or conductors. This feature is advantageous because multiple conductors communicating with multiple sensors 24 are eliminated, and the cost of protecting the transmission wires is reduced. Wire 46 can also transmit signals from surface controller 52 to sensors 24, or to sliding sleeve 10 or other downhole well tools. The invention identifies the position of magnet 20 relative to one or more sensors 24 and utilizes controller 52 to manage the movement or operation of sliding sleeve 10 or other downhole well tool in response to such detected signal. Although controller 52 is preferably located at the well surface, controller 52 could also be positioned downhole in the well.

It has been discovered that a sensor 24 located in aperture 26 can avoid the Faraday Shield effect produced by magnetically permeable tool body 12. Additionally, it has been discovered that the ability of sensor 24 to detect the magnetic flux of magnet 20 is minimized when sensor 24 is positioned at a distance from surface 18 equal to or greater than the mean diameter of aperture 26. Accordingly, a preferred embodiment of the invention positions sensor 24 at a distance from surface 18 which is less than the mean diameter of aperture 26 as defined below.

If aperture 26 is circular, the mean diameter is defined as the actual crossectional diameter of aperture 26. If aperture 26 has a crossectional shape that is not circular, then "mean diameter" is defined as the integrated sum of the various crossectional diameters passing through the geometric center of such shape. For a parallelogram, the "mean diameter" would be calculated as the sum of the diagonals divided by two.

The array of sensors 24 in FIG. 6 is positioned in a selected orientation along tool body 12. As sliding sleeve 10 and magnet 20 move axially within tool body 12, magnet 20 sucessively moves proximate to sensors 24. When the flux from magnet 20 contacts a sensor 24, a signal is generated by such sensor 24 and is transmitted through wire 46 to controller 52 at the well surface. As previously described, each resistor 44 in each sensor 24 can have a different resistance so that the signal generated by each sensor 24 has a different voltage or other type of signature. In this fashion, controller 52 can detect the signal and can determine which sensor 24 is responsible for generating the signal. The real time position of sliding sleeve 10 can be detected, and sensors 24 can be placed in different orientations to detect linear or rotational movement of sliding sleeve 10 relative to tool body 12. Additionally, the movement rate for sliding sleeve 10 can be calculated by measuring the time and distance between sucessive signals generated by more than one sensor 24 as magnet 20 moves relative to tool body 12.

In one embodiment of the invention, PCB 30 can be fully isolated from well pressures acting on exterior surface 16 as shown in FIG. 7. Aperture 54 completely extends through tool body 12 which is bounded in one embodiment of the invention by low pressure surface 56 and high pressure surface 58. Plug insert 60 is positioned within aperture 54 and has protrusions 62 for contacting tool body 12. Tapered pin 64 is pressed or driven within the recess of plug insert 60 to force protrusions 62 into sealing engagement with tool body 12. In this fashion, a metal-to-metal seal is formed between tool body 12 and plug insert 60. PCB 66 and magnetic sensor 68 are positioned within plug insert 60 and are isolated from contact with well fluids contacting either low presure surface 56 or high pressure surface 58. In a preferred embodiment of the invention, plug insert 60 and tapered pin 64 are preferably constructed from a magnetically nonpermeable material such as Inconel or Monel.

Signal communication with PCB 66 can be accomplished by modulating the magnetic source identified as magnet 20, by passing such modulated signal through plug insert 60 to a sensor, and by communicating a modulated signal through the permeable material adjacent pin 64. Such signal can then be communicated to surface controller 52 for demodulation. This combination of plug insert 60 and a magnetic sensor uniquely combines to provide a communicating means for transmitting signals through a pressure vessel wall such as tool body 12.

Referring to FIG. 8, PCB 70 is positioned on first element 72 which is contained within second element or pressure vessel 74. Nonmagnetic plug assembly 76 is positioned within the wall of pressure vessel 74, and encapsulates magnetic transceiver 78. Magnetic transceiver 80 is engaged with PCB 70 and moves with first element 72 relative to pressure vessel 74. When magnetic transceiver 80 is aligned with magnetic transceiver 78, signal communication can occur across plug assembly 76. Referring to FIG. 9, one embodiment of communication circuitry is illustrated wherein microcontroller 82 is engaged with modulator/demodulator 84, which in turn is also engaged with driver 86 and receiver 88. Driver 86 is engaged with electromagnetic source 90, which is selectively operated to activate magnetic sensor 92 engaged with receiver 88.

The present invention is particularly useful in downhole well tools, but is also applicable to any environment wherein a magnetically permeable tool body is used. In different equivalent uses of the invention, sensor 24 can be attached to sliding sleeve 10 and magnet 20 can be attached to tool body 20. Other orientations and configurations of such elements are further possible without departing from the concepts taught by the invention.

The invention provides a system for communicating signals through the wall of a pressure vessel without utilizing elastomeric seals potentially subject to failure. By communicating such signals through the magnetically permeable material adjactent the nonpermeable plug material, the communication system can be positioned within the wall dimension of the pressure vessel and does not extend beyond the interior or exterior of the pressure vessel dimensions. The invention permits less expensive magnetically permeable materials to be used for the tool body and other pressure vessel components, thereby reducing the overall cost to the well tool.

Although the invention has been described in terms of certain preferred embodiments, it will be apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A well apparatus for detecting the position of a first element movable relative to the inside surface of a magnetically permeable second element, comprising:

a magnetic source attached to the first element at a position downhole in the well;

a recess in the second element having an opening, at the inside surface of the second element, proximate to said magnetic source as the first element moves relative to the second element;

a magnetically nonpermeable plug within said recess; and a magnetic sensor within said plug at a distance from the second element inside surface, less than the mean diameter of said recess opening, for detecting and for transmitting a signal indicating the proximity of said magnetic source relative to said magnetic sensor.

2. A well apparatus as recited in claim 1, wherein said recess extends as an aperture through the second element.

3. A well apparatus as recited in claim 2, further comprising a low permeability insert within said recess between said sensor and said second element.

4. A well apparatus as recited in claim 1, wherein said magnetic source is attached to said recess in the second element, and wherein said magnetic sensor is attached to the first element.

5. A well apparatus as recited in claim 1, wherein said magnetic source comprises an electromagnet.

6. A well apparatus as recited in claim 5, wherein said electromagnet is modulated to communicate said signal through the second element.

7. A well apparatus as recited in claim 1, further comprising a display for identifying the signal from said magnetic sensor.

8. A well apparatus as recited in claim 1, further comprising a second magnetic sensor engaged with the second element, wherein each of said magnetic sensors are connected by one wire, and wherein each magnetic sensor is capable of transmitting a different signal identifying the proximity of said magnetic source relative to each magnetic sensor.

9. A well apparatus as recited in claim 8, further comprising a surface controller engaged with the first element and with said wire for receiving signals from said magnetic sensors, for identifying the proximity of said magnetic source relative to one of said magnetic sensors, and for generating a command for moving the first element relative to the second element.

10. A well apparatus for detecting the position of a first element movable relative to the inside surface of a magnetically permeable second element, comprising:

a magnetic source attached to the first element at a position downhole in the well;

an aperture through the second element at a position proximate to said magnetic source as the first element moves relative to the second element;

a low permeability plug within said aperture; and a magnetic sensor within said aperture at a distance from the second element inside surface, less than the mean diameter of said aperture, for detecting and for transmitting a signal indicating the proximity of said magnetic source relative to said magnetic sensor.

11. A well apparatus as recited in claim 10, wherein the second element comprises a pressure vessel, and wherein said plug maintains a pressure difference across said aperture in the second element.

12. A well apparatus as recited in claim 10, wherein said magnetic sensor is capable of modulating said signal through the second element.

13. A well apparatus as recited in claim 10, further comprising a second magnetic source and second magnetic sensor engaged with the first and second elements, wherein each of said magnetic sensors are connected by a wire, and wherein each magnetic sensor is capable of transmitting a different signal identifying the proximity of said magnetic source relative to each magnetic sensor.

14. A well apparatus as recited in claim 13, further comprising a surface controller engaged with the first element and with said wire for receiving signals from said magnetic sensors, for identifying the proximity of said magnetic source relative to one of said magnetic sensors, and for generating a command for moving the first element relative to the second element.

15. A well apparatus for detecting the position of a first element movable relative to the inside surface of a magnetically permeable second element, comprising:

a magnetic source attached to the first element at a position downhole in the well;

at least two apertures through the second element at selected locations in the second element;

a low permeability plug within each aperture;

a magnetic sensor within each aperture at a distance from the second element inside surface, less than the mean diameter of said aperture, for detecting and for transmitting a signal indicating the proximity of said magnetic source relative to each magnetic sensor;

a wire connected between each magnetic sensor for communicating the signals generated by each magnetic sensor; and a surface controller engaged with said wire for receiving signals from said magnetic sensors and for identifying the proximity of said magnetic source to one of said magnetic sensors.

16. A well apparatus as recited in claim 15, wherein said surface controller is engaged with the first element, and wherein said surface controller is capable of generating a command for moving the first element relative to the second element.

17. A well apparatus as recited in claim 15, wherein said magnetic source comprises an electromagnet.

18. A well apparatus as recited in claim 17, wherein said electromagnet is modulated to communicate through the second element.

19. A well apparatus as recited in claim 15, wherein said plug forms a metal-to-metal seal within said aperture.

20. A well apparatus as recited in claim 15, wherein said controller is capable of determining the movement rate of said first element relative to said second element.

* * * * *